Patented July 10, 1934

UNITED STATES PATENT OFFICE 1,965,829

METHOD OF PRODUCING METHYL-ISOBUTYL CARBINOL

Henri Martin Guinot, Mardre, France, assignor to Usines de Melle, Melle, France, a corporation of France No Drawing. Application October 24, 1930, Serial No. 491,079. In France January 7, 1930

1 Claim. (Cl. 260—156)

The present invention relates to a method of producing methyl-isobutyl carbinol. More especially, it relates to a method of producing methyl-isobutyl ketone and methyl-isobutyl carbinol from mesityl oxide.

For a number of years amyl alcohol and its derivatives have been regarded as important constituents of cellulose ester lacquers, as well as for other purposes. Until comparatively recently the chief source of amyl alcohol has been as one of the constituents of fusel oil, obtained during the rectification of ethyl alcohol produced by the fermentation of various carbohydrate materials. The production of fermentation amyl alcohol has therefore been dependent upon the amount of fusel oil obtained as a by-product in the ethyl alcohol industry and consequently the extent of its use has been largely determined by its availability and the possibility of substituting for it other somewhat similar materials.

It has now been found that methyl-isobutyl carbinol and its derivatives in many instances may be satisfactorily substituted for amyl alcohol and its corresponding derivatives. This is due in part to the striking similarity of many of the properties of these compounds.

Methyl-isobutyl carbinol boils at 130°–132° C. at a pressure equal to 760 mm. of mercury, as compared to 131° C. for isobutyl carbinol (amyl alcohol). The densities of these two compounds are within the range 0.812–0.818. They have the same general solubility properties and their corresponding principal esters boil at very near the same temperatures. Methyl-isobutyl carbinol has an odor which is regarded by many as being much more pleasant than that of either the normal or isoamyl compounds. Whereas the use of either of these latter alcohols in quantity in a composition such as cellulose ester lacquer imparts a "choking" odor, the use of methyl-isobutyl carbinol gives an odor suggestive of terpene that may be described as having a "clearing" rather than a "choking" effect.

According to the present invention, the industrial manufacture of methyl-isobutyl carbinol is carried out in three successive steps:

1. Preparation of diacetone alcohol by the condensation of acetone:

$$2CH_3-CO-CH_3 \rightarrow \underset{CH_3}{\overset{CH_3}{>}}\!\!C\!\!\underset{CH_2-CO-CH_3}{\overset{OH}{<}}$$

2. Dehydration of diacetone alcohol into mesityl oxide:

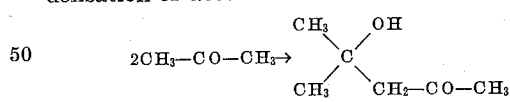

3. Hydrogenation of mesityl oxide into methyl-isobutyl ketone, and then into the corresponding alcohol:

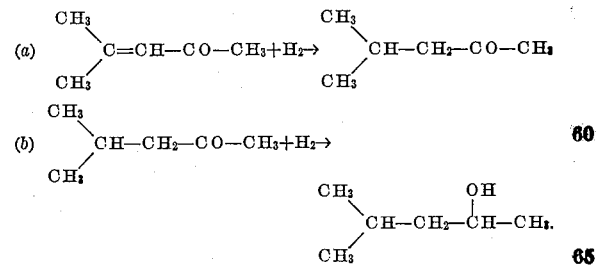

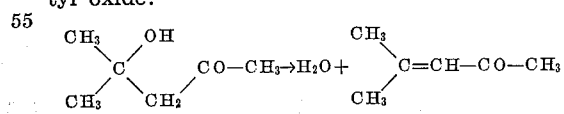

Of these three steps, the first two are already well known. It is preferred, however, and certain obvious industrial advantages are to be gained by following processes disclosed in my co-pending applications, U. S. Serial No. 470,028 for "Process for the production of diacetone alcohol", filed July 23, 1930, and U. S. Serial No. 470,027 for "Production of mesityl oxide", filed July 23, 1930.

It has now been discovered that the preparation of methyl-isobutyl carbinol by the hydrogenation of mesityl oxide may be satisfactorily carried out on an industrial scale in the presence of catalysts consisting of "non-noble" metals either alone or deposited on inert supports like asbestos, kieselguhr, etc. and either in the presence or absence of oxide promoters. Either gaseous or liquid phase hydrogenation gives satisfactory results. Catalysts which have been found to be satisfactory for this process are the usual hydrogenation catalysts consisting of metals such as nickel, copper, cobalt, iron, etc. The use of such catalysts represents an important improvement, without which the present process would not be of industrial importance.

Example

Acetone is condensed into diacetone alcohol by any suitable method, as for example, by agitating in the presence of an alkaline material such as quick lime, potash, alcoholic caustic soda, etc. It is preferred, however, to follow the procedure disclosed in my co-pending application U. S. Serial No. 470,028 for "Process for the production of diacetone alcohol", filed July 23, 1930. According to this process acetone is subjected to the action of an alkaline condensing agent dissolved in a solvent which is miscible with acetone and diacetone alcohol, said condensing agent being present as free alkali not in excess of one thousandth mole per liter of acetone.

The diacetone alcohol is next converted into mesityl oxide by any suitable method such as heating with a dehydration catalyst such as sulfuric or phosphoric acids, iodine, etc. It is preferred, however, to follow the procedure disclosed in my U. S. patent application, Serial No. 470,027 for "Process for the production of mesityl oxide", filed July 23, 1930. According to this process di-acetone alcohol is heated in the presence of a dehydration catalyst and sufficient water to form an azeotropic mixture with the mesityl oxide formed during the reaction.

The mesityl oxide obtained in this manner or by any other suitable means is then subjected to hydrogenation. This may be accomplished by passing it in vapor form with an excess of hydrogen over a catalyst composed of reduced copper supported on asbestos, the operating being carried out at a temperature of about 120° C. Under these conditions the mesityl oxide is completely hydrogenated, partly into methyl-isobutyl ketone (B. P. 114°–116° C.) and partly into methyl-isobutyl carbinol (B. P. 130°–132° C.).

If desired, the methyl-isobutyl ketone may be completely converted into methyl-isobutyl carbinol by being again subjected to the action of hydrogen in the presence of the catalyst. By following the procedure outlined a practically quantitative yield may be obtained.

Now having described my invention, what I desire to claim is:

The catalytic process for the production of methyl isobutyl carbinol from mesityl oxide, the improvement being in the direct obtainment of the carbinol from the mesityl oxide by subjecting the mesityl oxide to hydrogenation at atmospheric pressure at a temperature of about 120° C. in the presence of a catalyst chosen from the group consisting of nickel, copper, cobalt, and iron.

HENRI MARTIN GUINOT.